United States Patent

Alksnat et al.

Patent Number: 6,049,140
Date of Patent: Apr. 11, 2000

[54] BATTERY DISCONNECTION SYSTEM

[75] Inventors: Holger Alksnat, Gevelsberg; Jurgen Dinger, Remscheid; Thomas Brehmer, Wiehl, all of Germany

[73] Assignee: Delphi Automotive Systems Deutschland GmbH, Wuppertal, Germany

[21] Appl. No.: 09/010,389

[22] Filed: Jan. 21, 1998

[30] Foreign Application Priority Data

Jan. 30, 1997 [GB] United Kingdom .................. 9701936

[51] Int. Cl.[7] .................. B60R 25/00; H02H 7/18
[52] U.S. Cl. .................. 307/10.2; 180/287; 180/282; 280/735; 307/10.7
[58] Field of Search .................. 307/10.1–10.7, 307/131, 121, 116; 180/287, 271–274, 282; 429/150; 361/93, 100–102, 187; 280/734, 735; 701/45–47

[56] References Cited

U.S. PATENT DOCUMENTS

| | | | |
|---|---|---|---|
| 4,553,127 | 11/1985 | Issa | 307/10.2 |
| 4,798,968 | 1/1989 | Deem | 307/10.7 |
| 4,958,084 | 9/1990 | Carlo et al. | 307/10.2 |
| 5,449,957 | 9/1995 | Carlo | 307/10.3 |
| 5,574,316 | 11/1996 | Nieschultz | 307/10.7 |
| 5,818,122 | 10/1998 | Miyazawa et al. | 307/10.7 |

FOREIGN PATENT DOCUMENTS

| | | |
|---|---|---|
| 890684 | 2/1982 | Belgium . |
| 0628980 A1 | 12/1994 | European Pat. Off. . |
| 0658672 | 6/1995 | European Pat. Off. . |
| 2260635 | 4/1993 | United Kingdom . |
| 2265240 | 9/1993 | United Kingdom . |

OTHER PUBLICATIONS

European Seach Report and Annex corresponding to EP 98 20 0040 dated Apr. 20, 1998.

Primary Examiner—Richard T. Elms
Attorney, Agent, or Firm—Patrick M. Griffin

[57] ABSTRACT

A battery disconnection system (10) for mounting directly on a terminal (12) of a battery (16) of a motor vehicle comprising a housing (32); a battery terminal connector (17) secured to the housing; a normally closed electrical switch (20) mounted inside the housing; an electrical conductor (18) connected to the battery terminal connector and to one side (21) of the switch; one or more fuses (28) mounted inside the housing, and connected between the other side (23) of the switch and output terminals (29) mounted on the housing; a sensor (22) for detecting an adverse condition; an electromagnetically operated device (24) mounted inside the housing and electrically connected to the sensor, mechanically connected to the switch, and actuable on receipt of an adverse condition signal from the sensor to open the switch; and a manual control (26) mounted on the housing and mechanically connected to the switch for manually operating the switch. Reversible protection system with manual operation.

6 Claims, 1 Drawing Sheet

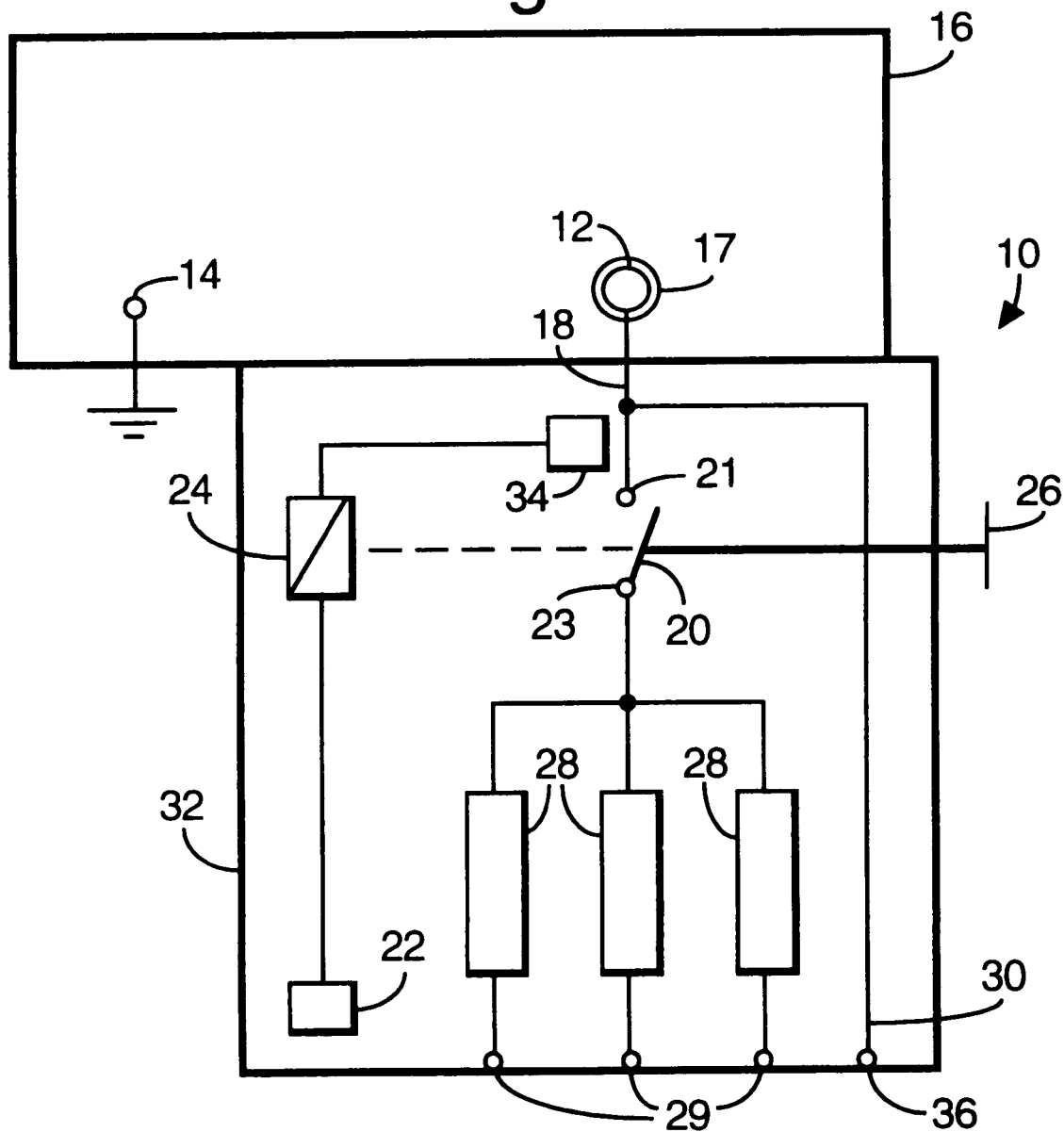

BATTERY DISCONNECTION SYSTEM

TECHNICAL FIELD

The present invention relates to a battery disconnection system for a motor vehicle.

BACKGROUND OF THE INVENTION

A battery disconnection system for a motor vehicle is known in which a detonator is used to cut an electrical lead connected to a terminal of the battery. The disadvantage of this system is that it is non-reversible—that is, after actuation, the electrical lead has to be replaced. GB-A-2260635 discloses a battery disconnection system which is mountable on a battery, but which does not provide protection from excessive currents or easy manual control.

SUMMARY OF THE INVENTION

It is an object of the present invention to provide a battery disconnection system which is manually reversible and which includes protection from excessive currents.

A battery disconnection system in accordance with the present invention for mounting directly on a terminal of a battery of a motor vehicle comprises a housing; a battery terminal connector secured to the housing; a normally closed electrical switch mounted inside the housing; an electrical conductor connected to the battery terminal connector and to one side of the switch; one or more fuses mounted inside the housing, and connected between the other side of the switch and output terminals mounted on the housing; a sensor for detecting an adverse condition; an electromagnetically operated device mounted inside the housing and electrically connected to the sensor, mechanically connected to the switch, and actuable on receipt of an adverse condition signal from the sensor to open the switch; and a manual control mounted on the housing and mechanically connected to the switch for manually operating the switch.

The battery disconnection system of the present invention disconnects the battery from the electrical loads when an adverse condition is detected. The disconnection system is such that, after the switch has been opened, the manual control can be operated to close the switch. The disconnection system is therefore easily reversible and does not require the replacement of any components. The manual switch can also be used to provide manual disconnection of the battery for battery energy storage, transportation of the motor vehicle, servicing, etc. The disconnection system also includes fuses between the switch and the electrical loads for protection against excessive currents.

BRIEF DESCRIPTION OF THE DRAWINGS

The present invention will now be described, by way of example, with reference to the accompanying drawing, in which:

FIG. 1 is a schematic diagram of a battery disconnection system in accordance with the present invention.

DESCRIPTION OF THE PREFERRED EMBODIMENT

The battery disconnection system 10 in accordance with the present invention shown in FIG. 1 is mounted directly on a battery 16 of a motor vehicle, the battery having a pair of terminals 12,14, one of which is connected to electrical ground. The battery disconnection system 10 comprises a housing 32 having a battery terminal connector 17 secured to the housing, the connector being directly connected to the terminal 12 of the battery 16. The disconnection system 10 further includes a normally closed electrical switch 20 mounted inside the housing 32; an electrical conductor 18 connected between the terminal connector 17 and one side 21 of the switch; and one or more fuses 28 mounted inside the housing, and connected between the other side 23 of the switch and output terminals 29 mounted on the housing. The output terminals 29 are connectable to electrical loads (not shown) in the motor vehicle. One or more sensors 22 for detecting an adverse condition are electrically connected to an electromagnetically operated device 24, preferably an electromagnetic relay or a solenoid, mounted inside the housing 32. The sensor or sensors 22 may be mounted at any suitable location within the vehicle, but are preferably mounted inside the housing 32. The electromagnetically operated device 24 is mechanically connected to the switch 20, and is actuable on receipt of an adverse condition signal from the or one of the sensors 22 to open the switch. A manual control 26 is mechanically connected to the switch for manually operating the switch. The manual control 26 is mounted on the housing 32.

An additional electrical conductor 30 is preferably connected between the battery terminal connector 17 and an additional output terminal 36 mounted on the housing 32. The additional conductor 30 bypasses the switch 20 and the fuses 28, and provides a permanent power supply to certain selected electrical loads, such as safety devices like hazard warning lamps, or security devices (not shown), in the motor vehicle even when the switch 20 is open.

The or one of the sensors 22 is preferably a crash sensor which detects a sudden deceleration of the motor vehicle or a sensor associated with an air bag system within the motor vehicle. An alternative or additional sensor may be an anti-theft device which detects an attempted theft of, or break in to, the motor vehicle. An additional form of anti-theft device may be an electronic circuit which detects an attempt to start the motor vehicle without the correct ignition key being present in the ignition switch, or which detects the absence of the ignition key from the ignition switch. When an adverse condition is detected by the or one of the sensors 22, the sensor sends an adverse condition signal to the electromagnetically operated device 24 which, on receipt of such a signal, acts on the switch 20 to open the switch and disconnect the power supply from the battery 16 to the non-selected loads in the motor vehicle.

The disconnection system 10 also preferably includes a Hall sensor 34, which is preferably mounted inside the housing 32, and which detects an excessive (overload) current from the battery 16, for example by sensing the current in the electrical conductor 18. The Hall sensor 34 is electrically connected to the electromagnetically operated device 24 and provides an adverse condition signal to the electromagnetically operated device when an excessive current is detected to open the switch 20.

The present invention may also include reverse operation of the electromagnetically operated device 24 when the adverse condition signal is no longer present—that is, when the adverse condition is no longer detected by the or one of the sensors 22. In this case, the electromagnetically operated device 24 acts on the switch 20 to close the switch and reconnect the non-selected loads to the battery 16. Additionally, or alternatively, the switch 20 may be closed by an electro-thermal device, such as a bi-metallic lever with a heating coil (not shown), which operates if no short circuit condition is detected (for example, by the Hall sensor 34) after an adverse condition signal has been generated and the switch opened.

When required, the switch 20 can be closed manually by operation of the manual control 26 to reconnect the battery 16 to the non-selected loads. Also, when required, the switch 20 can be opened manually by operation of the manual control 26 to disconnect the battery 16 from the non-selected loads, for example, during transportation of the motor vehicle, during servicing of the motor vehicle, or during battery charging.

The battery disconnection system of the present invention is suitable for mounting on a battery having terminals positioned on the top of the battery or terminals positioned on the side of the battery.

We claim:

1. In a battery disconnection system (10) for mounting directly on a terminal (12) of a battery (16) of a motor vehicle of the type having a housing (32); a battery terminal connector (17) secured to the housing; a normally closed electrical switch (2) mounted inside the housing; an electrical conductor (18) disposed in the housing and connected to the battery terminal connector and to one side (21) of the switch; a sensor (22) mounted inside the housing (32) for detecting an adverse condition; an electromagnetic relay (24) mounted inside the housing and electrically connected to the sensor, mechanically connected to the switch, and actuable on receipt of an adverse condition signal from the sensor to open the switch; and a manual control (26) mounted on the housing and mechanically connected to the switch for manually operating the switch, the improvement in combination therewith of one or more fuses (28) mounted inside the housing, and connected in series circuit relation with the switch (20) and between the other side (23) of the switch and one or more individually associated output terminals (29) mounted on the housing; and further comprising an additional electrical conductor (30) mounted inside the housing and connected between the battery terminal connector (17) and an additional output terminal (36) mounted on the housing, the additional electrical conductor (30) providing a fuseless or otherwise electrically uninterruptible connector to continuously bypass the fuse or fuses (28) and switch (20) regardless of the occurrence of any such adverse condition.

2. A battery disconnection system as claimed in claim 1 wherein the sensor (22) comprises a vehicle crash sensor.

3. A battery disconnection system as claimed in claim 1 wherein the sensor (22) comprises an anti-theft device.

4. A battery disconnection system as claimed in claim 3 wherein the sensor (22) comprises also a vehicle crash sensor.

5. A battery disconnection system as claimed in claim 1 further comprising a Hall sensor (34) mounted inside the housing (32) for detecting in the electrical conductor (18) excessive current from the battery (16), the Hall sensor being connected to the electromagnetic relay (24) to provide an adverse condition signal to the electromagnetic relay when such excessive current is detected.

6. A battery disconnection system as claimed in claims 1, 2, 3, 4 or 5 wherein the electromagnetic relay (24) closes the switch (20) when the adverse condition signal is no longer received.

* * * * *